US008861405B2

(12) United States Patent
Sobota

(10) Patent No.: US 8,861,405 B2
(45) Date of Patent: Oct. 14, 2014

(54) VOICE BAND SWITCHING UNIT

(75) Inventor: Justin Timothy Sobota, Germantown, MD (US)

(73) Assignee: Texas Instruments Incorporated, Dallas, TX (US)

( * ) Notice: Subject to any disclaimer, the term of this patent is extended or adjusted under 35 U.S.C. 154(b) by 609 days.

(21) Appl. No.: 13/198,257

(22) Filed: Aug. 4, 2011

(65) Prior Publication Data

US 2013/0034026 A1  Feb. 7, 2013

(51) Int. Cl.
*H04L 12/16* (2006.01)
*H04Q 11/00* (2006.01)
*H04M 3/56* (2006.01)
*H04L 12/18* (2006.01)
*H04L 29/06* (2006.01)

(52) U.S. Cl.
CPC ......... *H04L 12/1827* (2013.01); *H04L 12/1813* (2013.01); *H04L 29/06414* (2013.01); *H04M 3/561* (2013.01)
USPC ........... 370/263; 370/259; 370/260; 370/261; 370/262

(58) Field of Classification Search
CPC .. H04M 3/561; H04M 3/67; H04L 29/06414; H04L 12/1813
See application file for complete search history.

(56) References Cited

U.S. PATENT DOCUMENTS

| 7,911,968 | B1* | 3/2011 | Foladare et al. | 370/252 |
| 8,411,668 | B1* | 4/2013 | Croak et al. | 370/352 |
| 2007/0036229 | A1 | 2/2007 | Gass | |
| 2010/0277204 | A1* | 11/2010 | Guetta et al. | 327/39 |
| 2010/0322233 | A1 | 12/2010 | LeBlanc et al. | |
| 2011/0137660 | A1* | 6/2011 | Strommer et al. | 704/500 |

* cited by examiner

*Primary Examiner* — Hassan Phillips
*Assistant Examiner* — Lonnie Sweet
(74) *Attorney, Agent, or Firm* — Steven A. Shaw; Frederick J. Telecky, Jr.

(57) ABSTRACT

A method of dynamically switching voice channels between sampling rates in a telecommunication system including a plurality of conferenced channels that have a telephony side, a network side, and a conferencing unit therebetween. During conferencing the presence of a switching stimuli is detected, and at least a first affected voice channel affected by the switching stimuli is identified from the plurality of conferenced voice channels. Responsive to the switching stimuli, based on a telephony side sampling rate of the first affected voice channel, a network side sampling rate of the first affected voice channel, and respective sampling rates of other conferenced voice channels, it is determined whether or not to switch a sampling rate for at least the first affected voice channel using a switching criteria. Provided the determining decides to switch, the sampling rate is switched for at least the first affected voice channel.

15 Claims, 6 Drawing Sheets

VOICE BAND SWITCHING UNIT

FIELD

Disclosed embodiments relate adaptation of the voice sample rate in telecommunications systems that support conferencing between a plurality of voice channels, with both narrowband and wideband sampling rates supported on both the telephony side and network sides of the voice channels.

BACKGROUND

Voice applications in a telecommunications system including a plurality of conferenced voice channels have several criteria to support while trying to maintain a low Millions of Instructions Per Second (MIPS) footprint and low per-channel end-to-end delay. On the telephony side of the voice application, simultaneous support is needed for narrowband (NB) and wideband (WB) telephony interface devices attached to a modulation bus (e.g., a Pulse Code Modulation (PCM) bus) within a telephony interface (e.g., TDM). On the network side of the voice application, voice channels should transmit and receive voice data encoded and decoded using NB and WB codecs. All channels in the voice application should be able to be conferenced together no matter the operating sampling rates for the telephony side and network side of each voice channel. The operating sampling rate can be either NB or WB.

A voice application's MIPS and per-channel delay performance can be adversely affected by supporting multiple sampling rates at the modulation bus (e.g., TDM) and the network. The addition of the WB sampling rate involves voice channels utilizing upsamplers and downsamplers to convert the samples between the WB rate and the NB rate. The addition of upsamplers and downsamplers to the voice channels has at least two effects. First, the MIPS consumed per channel increases for each upsampler and downsampler used. Second, the end-to-end delay in the voice channel increases with each upsampler and downsampler added within the $T_X$ and $R_X$ signal processing paths.

An issue that arises when supporting WB and NB simultaneously within the same voice application is the effect upsamplers and downsamplers have on NB channel performance. When dual support of WB and NB channels is added to the voice application the NB channels need upsamplers and downsamplers at all times. The reason for this is, at any time, NB and WB voice channels can be conferenced together. A close operation and then a re-open operation on the NB channel to add upsamplers and downsamplers at the time of the conference is generally not allowed because voice channel statistics and configuration information would be lost.

SUMMARY

Disclosed embodiments include what is referred to herein a Voice Band Switching Units (VBSU) that can complement conferencing units in telecommunication systems. Disclosed VBSUs effectuate changes to modules in the voice channels of a telecommunications system that solves the problem of maintaining conferencing interoperability between, and minimal resource usage by, the voice channels in a voice application that supports multiple sampling rates (e.g., 8 kHz, 16 kHz) on the telephony and network interfaces. The VBSU dynamically switches voice channels between different sampling rates based on consideration of the channel's telephony side sampling rate, network side sampling rate, and sampling rates of any of the conferenced voice channels.

The VBSU comprises channel scan logic and control and switch logic. The channel scan logic senses the channel's telephony side sampling rate, network side sampling rate, and sampling rates of any conferenced voice channels. The control and switch logic enables or disables upsamplers and downsamplers in one or more of the conferenced voice channels based on the VBSU's determination of which upsamplers and downsamplers are to be enabled or disabled.

One embodiment comprises a method of dynamically switching voice channels between sampling rates in a telecommunication system including a plurality conferenced voice channels comprising a telephony side, and a network side, and a single (global) conferencing unit therebetween. During conferencing between the conferenced voice channels, the presence of a switching stimuli is detected, and at least one affected voice channel referred to herein as a "first affected voice channel" that is affected by the switching stimuli is identified from the plurality of conferenced voice channels. Responsive to the switching stimuli, based on a telephony side sampling rate of the first affected voice channel, a network side sampling rate of the first affected voice channel, and respective sampling rates of the other conferenced voice channels, it is determined whether or not to switch a sampling rate for at least the first affected voice channel using a switching criteria. Provided the determining decides to switch, the sampling rate is switched to a different sampling rate for at least the first affected voice channel.

Disclosed VBSUs function to maintain the voice channels at the least common sampling rate so as to preserve DSP MIPS resources and low end-to-end voice delay. Maintaining low MIPS and low delay improves voice channel performance. Disclosed VBSUs thus solve the problems of MIPS and delay increases for higher sampling rate channels, such as WB channels, due to the upsamplers and downsamplers used for interoperability with telephony, conferencing, and network interfaces that operate at different sampling rates.

An advantage of disclosed VBSU's is that the voice channels can switch between sampling rates on the fly (real-time) without the voice channels having to be closed then re-opened, or reinitialized. DSP MIPS are preserved given the operating sampling rates of all opened channels. Per voice channel end-to-end delay is also minimized whenever possible given the operating rates of all opened voice channels.

DETAILED DESCRIPTION

Figure 1:
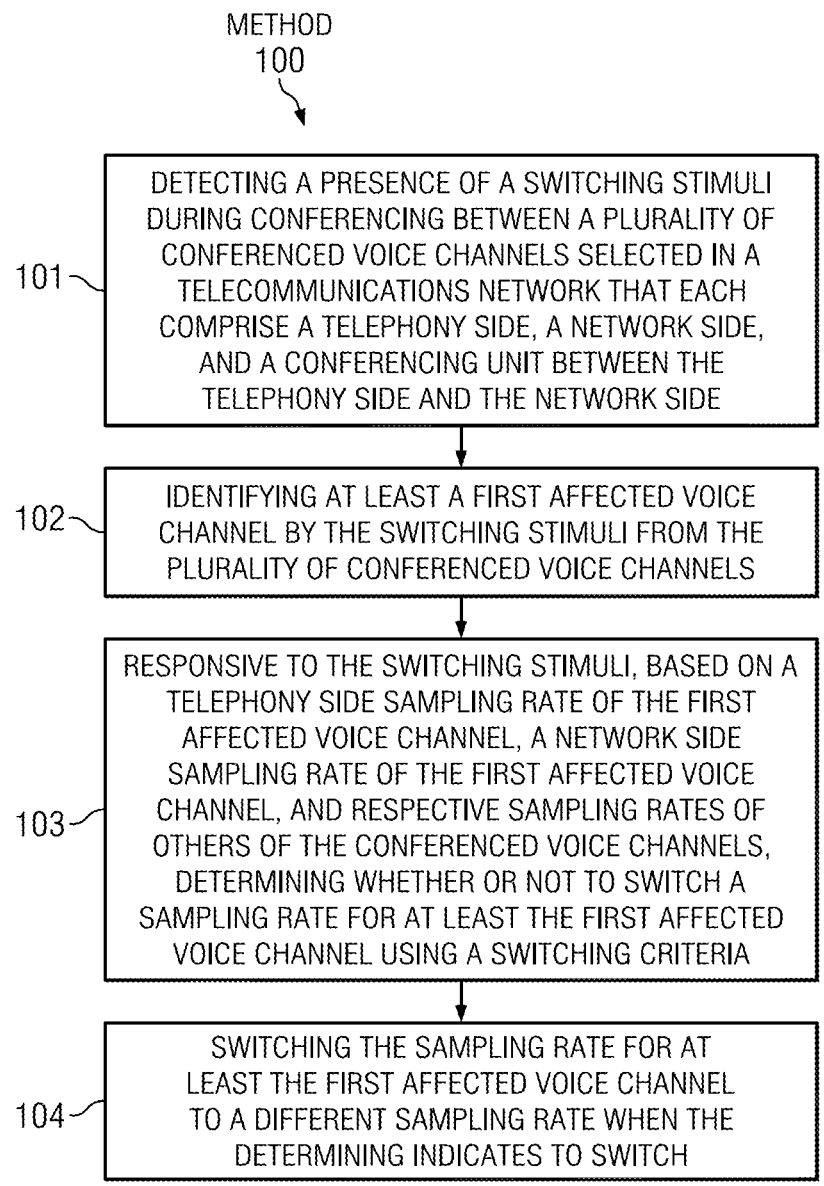
FIG. 1 is a flow chart that shows steps in an example method for dynamically switching voice channels between different sampling rates, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure. The following Acronyms are used herein:

| Acronym | Description |
| --- | --- |
| MIPS | Millions of Instructions Per Second |
| WB | Wideband |
| NB | Narrowband |
| TDM | Time Division Multiplexer |
| PCM | Pulse Code Modulation |
| TX | Transmit |
| RX | Receive |
| VBSU | Voice Band Switching Unit |

Disclosed embodiments are generally described with respect to TDM communications. However, disclosed VBSUs can generally be used with any telephony interface that supports both WB and NB samples. Another example is a Universal Serial Bus (USB) interface. For USB-based systems, voice samples are buffered in FIFOs and are then generally fed to a Digital Enhanced Cordless Telecommunications (DECT) base station over a USB interface.

FIG. 1 is a flow chart that shows steps in an example method 100 for dynamically switching voice channels between different sampling rates in a telecommunications system, according to an example embodiment. The telecommunications system includes a plurality of voice channels that comprise a telephony side, and a network side, and a single conferencing unit complemented by a disclosed VBSU between the telephony side and the network side.

As described below, conferencing units complemented by a disclosed VBSU dynamically enables and disables upsamplers and downsamplers in the telephony and/or network side of a voice channel to change its sampling rate responsive to switching stimuli throughout its lifetime so that any of the conferenced voice channels can use either a WB or NB, a WB or NB codec, and be conferenced with any other voice channel in the system no matter its sampling rate. The VBSU is operable to maintain the least number of upsamplers and downsamplers needed for "correct operation".

As used herein, "correct operation" refers to operation without introducing error or creating abnormalities, such as corrupted samples which result in anything from short "clicks" and "pops" to completely inaudible speech in the voice frame for both the Tx and Rx paths given a voice channel's telephony and network sampling rates, as well as its role in any conferencing connections. In the to-net (Tx) direction, correct operation refers to telephony voice samples being encoded by the codec and sent out on the network interface without error or creating abnormalities in the voice frame. Correct operation in the from-net (Rx) direction refers to receiving a voice packet, decoding it using the codec and providing the voice samples to the telephony interface without error or creating abnormalities in the voice frame.

A disclosed VBSU can implement all steps in method 100 described below (steps 101-104). A single (global) conferencing unit complemented by a disclosed VBSU can service all voice channels in the telecommunications system and implement disclosed methods. Ports in the conferencing unit are opened/closed by a system framework, such as labeled in FIGS. 3-6 as "framework for multi-function & multi-instance operation" 395, when voice channels are created/deleted, respectively, and connected together to form the actual conferences. The VBSU can use the global conferencing unit's knowledge of all channel connections to find connected channels and to know their sampling rates.

Step 101 comprises detecting (or sensing) the presence of what is referred to herein as a "switching stimuli". Disclosed switching stimuli can be with respect to any of the plurality of conferenced voice channels, and comprise any of the following:

a) a Tx direction codec switchover (e.g., executed from a control message received from a host application);
b) a Rx direction codec switchover (e.g., executed when a packet of data is received by a channel with a different coding type than originally configured);
c) a conferencing connection is established with an ongoing WB conference, and
d) one or more conferencing connections are deleted.

Step 102 comprises identifying at least a first affected voice channel by the switching stimuli from the plurality of conferenced voice channels. In step 103, responsive to the switching stimuli, based on a telephony side sampling rate of the first affected voice channel, a network side sampling rate of the first affected voice channel, and respective sampling rates of others of the plurality of conferenced voice channels, it is determined whether or not to switch a sampling rate for at least the first affected voice channel using a switching criteria.

Some example switching criteria that can be used include the following (described relative to TDM): a) a Tx codec switches from NB to WB, b) a Tx codec switches from WB to NB, c) a Rx codec switches from NB to WB, d) a Rx codec switches from WB to NB, e) one or more NB channels are conferenced with a channel running a WB conferencing unit (could be a WB TDM channel or a NB TDM channel using a WB codec), which stimulates the one or more NB channels to switch to WB, and f) any situation in which one or more NB TDM channels are conferenced with a channel running a WB conference (could be a WB TDM channel or a NB TDM channel using a WB codec) and the WB channel is dropped from the conference or switches to NB. This will stimulate the NB TDM channels to switch to the NB mode. In addition, g) any situation in which two or more NB TDM channels are conferenced and one of the voice channels undergoes a codec switchover to a WB codec, which stimulates the remaining conferenced NB channels to switch to WB.

The determining can further comprises determining whether or not to switch a sampling rate for at least one of the other conferenced voice channels (in addition to the first affected voice channel). Step 104 comprises switching (changing) the sampling rate for at least the first affected voice channel to a different sampling rate provided the determining in step 103 indicates to switch.

For example, assume at a particular time a first NB voice channel (NB SLIC and NB voice CODEC) is conferenced with another (second) NB voice channel (NB SLIC and NB voice CODEC). The first NB voice channel incurs a codec switchover to a WB codec, which is sensed by the VBSU as a switching stimuli. The VBSU then identifies the first NB voice channel as an affected voice channel (the "first affected voice channel"), determines to switch a sampling rate of the first affected voice channel, and switches the first voice channel to WB. In this example the switching criteria is the codec switching for NB to WB. As a result of the switch of the first voice channel to WB, the VBSU also switches the conferenced (second) channel to WB as well.

Figure 2:
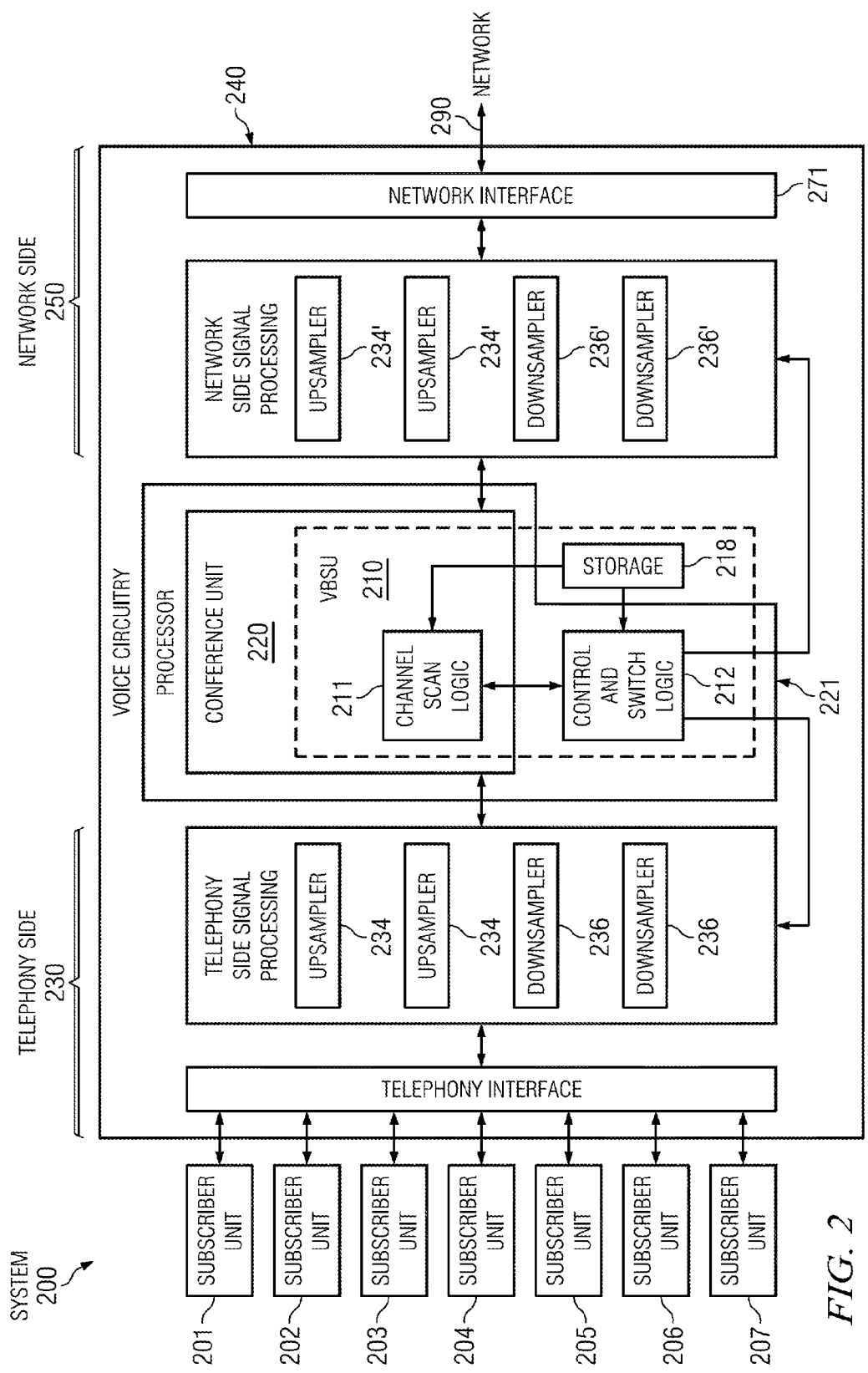
FIG. 2 is a block diagram representation of a telecommunications system including a conferencing unit having a disclosed VBSU, according to an example embodiment.

FIG. 2 is a block diagram representation of an example telecommunications system 200 including a plurality of subscriber units (or parties) 201-207, and voice circuitry 240 including a conferencing unit 220 complemented by a disclosed VBSU 210 for dynamically switching between sampling rates for a plurality of conferenced voice channels associated with any combination of the subscriber units 201-207. The voice circuitry 240 comprises a telephony side 230 including upsamplers 234 and downsamplers 236, and a network side 250 including upsamplers 234' and downsamplers 236'. Voice circuitry 240 is shown including a network interface 271 that provides an interface to a network 290 (e.g., a common network site, such as a central office).

Although not shown in FIG. 2, the telephony side 230 includes a modulation bus (e.g., a PCM bus) within a telephony interface (e.g., TDM), and the network side includes codecs. A processor (e.g., a digital signal processor) 221 implements the conferencing unit 220 and a processing portion of the VBSU 210 (channel scan logic 211 of the VBSU 210 and control and switch logic 212 of the conferencing unit 220/VBSU 210), where the conferencing unit 220 is positioned between the telephony side 230 and the network side 250. The other blocks/modules in FIG. 2 other than the memory shown as non-transitory machine readable storage 218 are also generally processor implemented.

The VBSU 210 comprises non-transitory machine readable storage 218 having stored executable voice channel sampling rate switching software and a plurality of stored switching stimuli and switching criteria. The VBSU 210 software assumes that any voice channel can use either a WB or NB, a WB or NB codec, and can be conferenced with any other voice channel no matter its current sampling rate. For example, VBSU 210 allows a voice channel that utilizes the NB telephony interface to dynamically switch between a fully NB and fully WB send/receive voice channel. The sampling rate the voice channel operates in is dependent upon the network codec used and the conferencing connections to the channel. The voice channel sampling rate switching software implements:

channel scan logic 211 for (i) sensing a presence of one of a plurality of switching stimuli and (ii) sensing the first affected voice channel's telephony side sampling rate, the first affected voice channel's network side sampling rate, and sampling rates for others of the conferenced voice channels. As described above, the VBSU 210 is run when at least one of the following switching stimuli occur for a given voice channel:

a) a Tx direction codec switchover (e.g., executed from a control message received from the host application)
b) a Rx direction codec switchover (e.g., executed when a packet is received by a channel with a different coding type than originally configured)
c) conferencing connection is established with an ongoing wideband conference, and
d) conferencing connection(s) is/are deleted.

In order to determine which of the other voice channels are affected by the switching stimuli, channel scan logic 211 of VBSU 210 can recursively parse all conferencing connections searching for all voice channels that may be connected to the first affected voice channel. The recursive search can form a mapping of all voice channels that are connected to the first affected voice channel. As described below, the VBSU 210 can then evaluate all mapped channel's sampling rates and initiate on-the-fly voice band switches for those voice channels that meet a switching criteria. The VBSU logic's can implement band switches that minimize the number of upsamplers and downsamplers open for correct operation across all voice channels in the conference, defined above to be operation without error or creating abnormalities in the voice frame for both the Tx and Rx paths.

Control and switch logic 212 is for sensing at least a first affected voice channel affected by the switching stimuli from the conferenced voice channels, determining whether or not to initiate switching of a sampling rate to a different sampling rate for at least the first affected voice channel based on the switching criteria, and identifying a selected group of upsamplers (from 234, 234'') and downsamplers (from 236, 236') in at least the first affected voice channel to be either enabled or disabled. The group of upsamplers and downsamplers can be identified since the upsamplers and downsamplers have their own instance in each voice channel. Control and switch logic 212 allows the VBSU 210 to know which upsamplers and downsamplers instances should be disabled to reach a desired channel configuration. If switching is indicated, control and switch logic 212 sends control signals to implement the enabling or disabling for the selected group of upsamplers and downsamplers (see FIGS. 3-6 described below for additional details). A brief (e.g., 30 ms) channel mute operation for all voice channels following switching is included to allow the filters in the upsamplers and downsamplers to converge after the switch.

The control and switch logic 212 of VBSU 210 is also operable to maintain the least amount of upsamplers and downsamplers required for correct operation given a channel's telephony and network sampling rates as well as its role in any conferencing connections. The switching function performed on the upsamplers and downsamplers by the VBSU 210 thus limits the system MIPS penalty and per-channel end-to-end delay penalties.

There are five total voice channel configurations for TDM operations described below. The channel configurations can be separated into two, mutually exclusive, groups. The groups are based on the sampling rate of the telephony interface device utilized by a voice channel. A voice channel that utilizes a NB TDM device has three voice channel configurations that the VBSU 210 can dynamically switch between. A voice channel that utilizes a WB TDM device has two voice channel configurations that the VBSU 210 can dynamically switch between. Dynamically switching a voice channel's TDM device is generally not allowed, so that the TDM device used by a voice channel is used for the channel's entire lifetime, from open until close.

NB TDM Device Voice Channel Configurations (3):

The three NB TDM device configurations cover all possible NB and WB scenarios a NB TDM voice channel may encounter during its lifetime. The scenarios are as follows:

1) NB TDM device, a NB conferencing bridge due to a conference with no other parties or a conference with only NB parties, communicating with another voice-capable agent over the network using a NB codec.
2) NB TDM device, a WB conferencing bridge due to a conference with at least one WB party, communicating with another voice-capable agent over the network using a NB codec.
3) NB TDM device, a WB conferencing bridge conferenced with any amount of parties, communicating with another voice-capable agent over the network using a WB codec. The conferencing bridge is WB due to a WB codec being used for network communication and is not dependent on the sampling rate of channels it is conferenced with.

WB TDM Device Voice Channel Configurations (2):

A voice channel that utilizes a WB telephony interface is inherently WB and lacks the ability to disable all upsamplers and downsamplers. At a minimum, the conference rate will be fixed as WB, the channel will have a downsampler in the Tx direction and an upsampler in the Rx direction for encoding/decoding of NB voice codecs.

1) WB TDM device, a WB conferencing bridge, communicating with another voice-capable agent over the network using a WB codec.

2) WB TDM device, a WB conferencing bridge, communicating with another voice-capable agent over the network using a NB codec.

Figure 3:
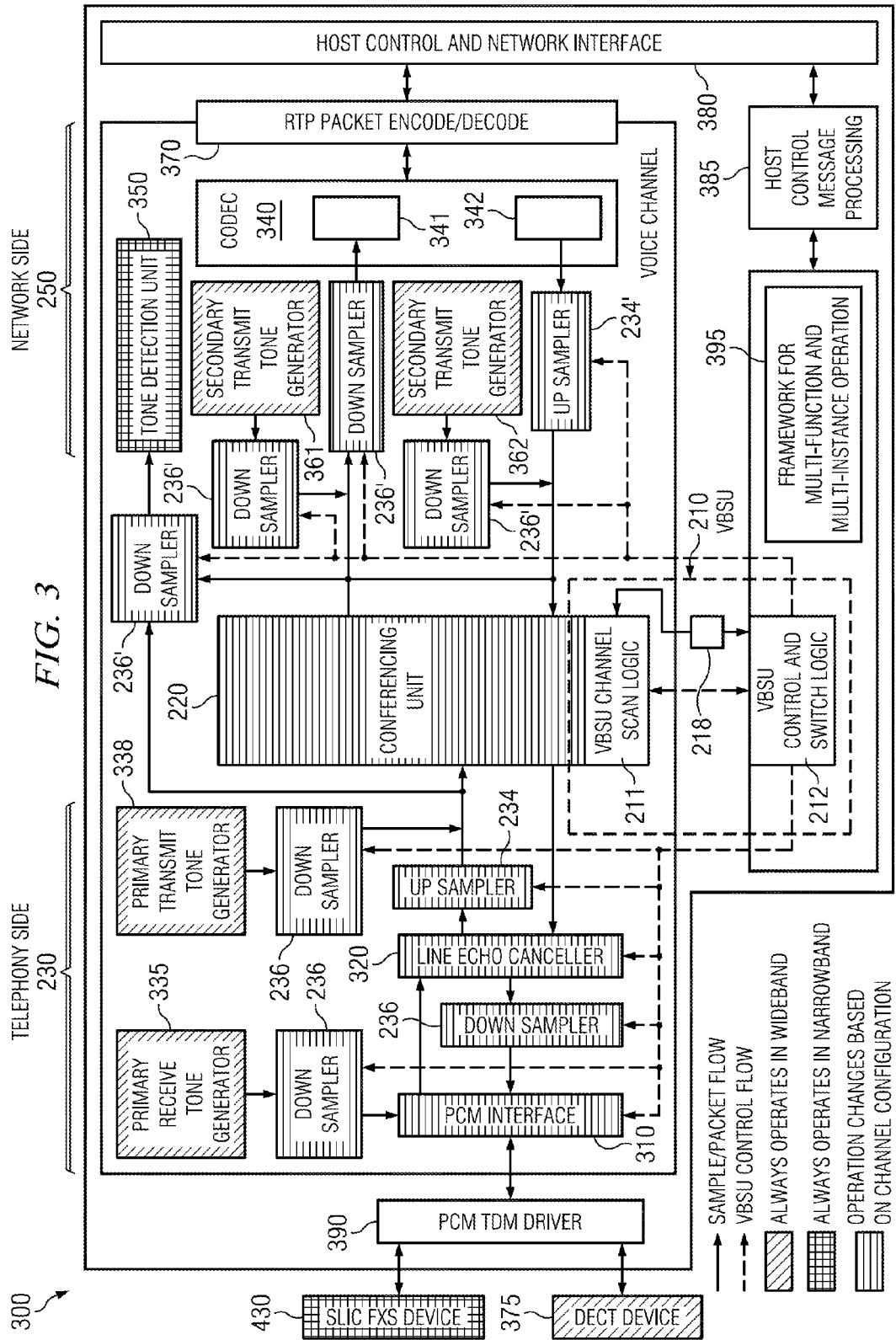
FIG. 3 depicts the location of a disclosed VBSU within the voice subsystem and its control over different voice subsystem modules, according to an example embodiment.

FIG. 3 is a block diagram depiction 300 that depicts the location of VBSU 210 within the voice subsystem and its control over different voice modules, according to an example embodiment. Sample/packet flows and VBSU control flows are shown, as are WB rate or NB rate operation after switching for the respective modules.

VBSU 210 includes VBSU channel scan logic 211, VBSU control and switch logic 212 and non-transitory machine readable storage shown as 218. As described above, framework for multi-function & multi-instance operation 395 shown in FIG. 3 opens/closes ports in the conferencing unit 220 when voice channels are created/deleted, respectively, and connected together to form the actual conferences.

VBSU control and switch logic 212 is shown controlling PCM interface 310 and line echo canceller 320, an several upsamplers and downsamplers. VBSU control and switch logic 212 controls downsampler 236 positioned between primary receive tone generator 335 and PCM interface 310, a downsampler 236 between primary transmit tone generator 338 and the Tx path between line echo canceller 320 and conferencing unit 220, a downsampler 236 between line echo canceller 320 and PCM interface on the Rx path and an upsampler 234 on the Tx path between line echo canceller 320 and conferencing unit on the Tx path, all on the telephony side 230.

The SLIC FXS Device block 430 provides the Subscriber Line Interface Circuit (SLIC) function. The PCM TDM Driver module 390 interfaces with the SLIC FXS device block 430 and the DECT Device 375 over a TDM bus.

On the network side 250, VBSU control and switch logic 212 is shown controlling downsampler 236' between tone detection unit 350 and a node on the Tx path on telephony side 230, and several nodes on the network side 250, downsampler 236' between secondary transmit tone generator 361 on the Tx path and conferencing unit 220, downsampler 236' between conferencing unit 220 and voice encoder algorithm 341 of CODEC 340 on the Tx path, downsampler 236' between secondary transmit tone generator 362 and conferencing unit on the Rx path, and an upsampler 234' between voice decoder algorithm 342 of CODEC 340 and the conferencing unit 220 on the Rx path. The RTP packet encode/decode module 370 shown on network side 250 handles processing of the RTP headers for network transmission and reception. In the Tx to network direction encode/decode module 370 takes the CODEC encoded voice frame and encapsulates it within a RTP packet for network transmission. In the Rx from network direction encode/decode module 370 extracts a CODEC encoded block of data from the RTP packet which it forwards to the Voice Coding Unit provided by voice decoder algorithm 342 for decoding into a voice frame.

Host control and network interface block 380 is also shown in FIG. 3. The host control message processing block 385 shown couples information between the host control and network interface block 380 and VBSU control and switch logic 212, and between the host control and network interface block 380 and framework for multi-function & multi-instance operation 395.

Figure 4:
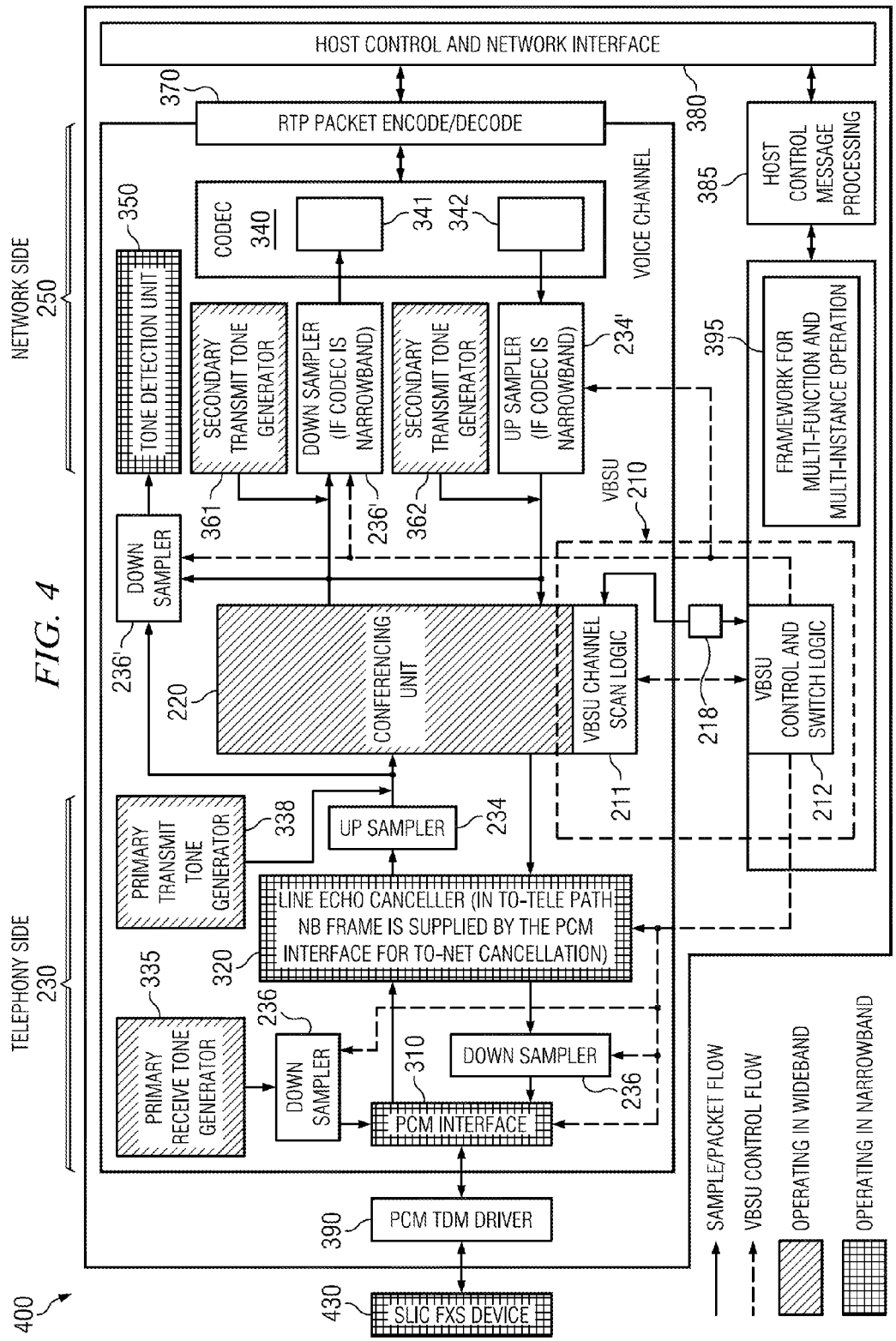
FIG. 4 depicts how a disclosed VBSU changes the voice subsystem to fit the needs of a NB telephony interface conferenced with other WB channels, according to an example embodiment.

FIG. 4 is a block diagram depiction 400 that depicts how a disclosed VBSU 210 changes the voice subsystem to fit the needs of a NB telephony interface shown as SLIC FXS device 430 conferenced with other WB channels, according to an example embodiment. Sample/packet flows and VBSU control flows are shown, as are WB rate or NB rate operation after switching for the respective modules. VBSU control and switch logic 212 is shown controlling PCM interface 310 and line echo canceller 320, upsampler 234 on the Tx path between line echo canceller 320 and conferencing unit 220, downsampler 236 between primary receive tone generator 335 and PCM interface 310, and downsampler 236 between line echo canceller 320 and PCM interface 310 on a Rx path.

Figure 5:
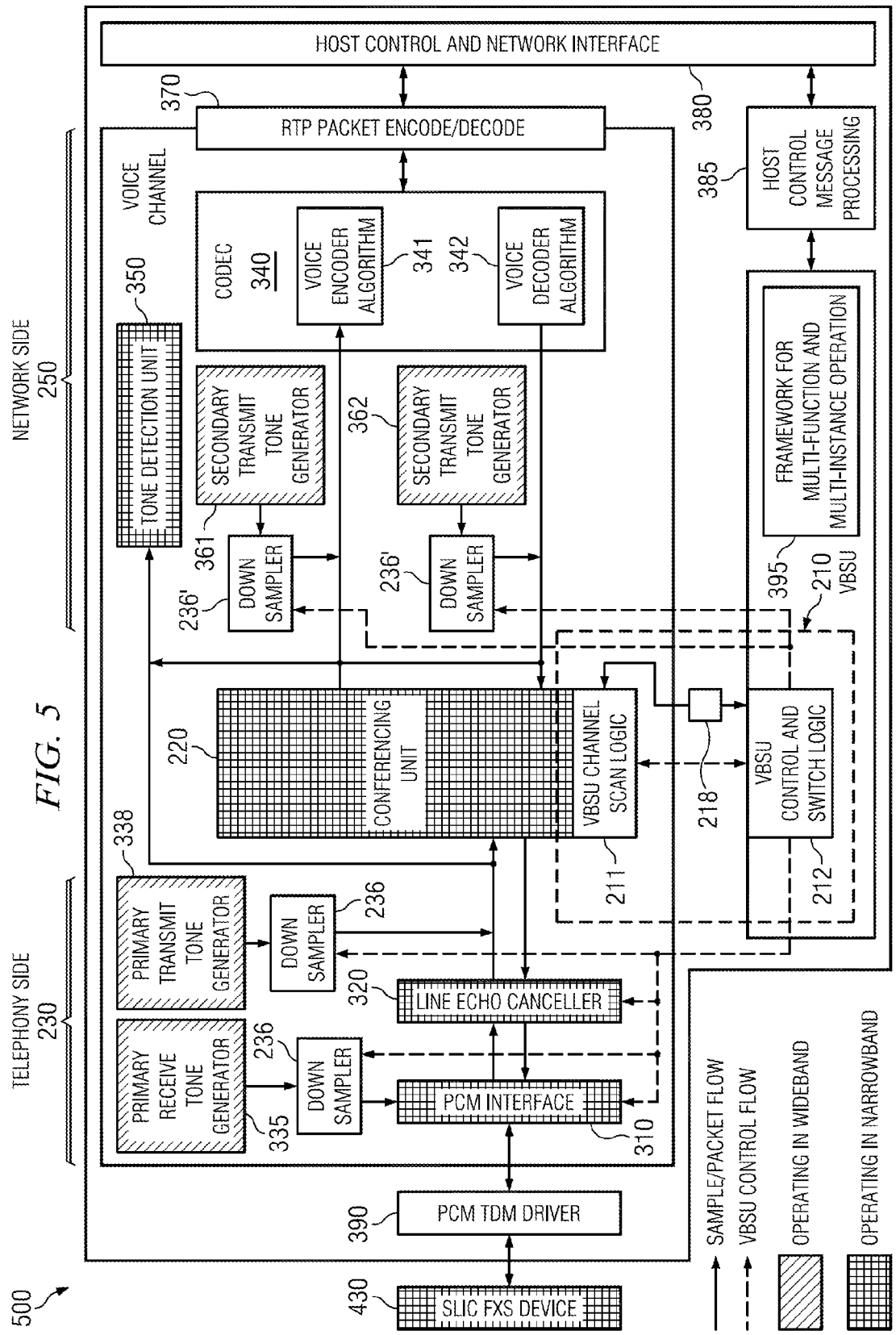
FIG. 5 depicts how a disclosed VBSU changes the voice subsystem to fit the needs of a NB telephony interface conferenced other NB channels, according to an example embodiment.

FIG. 5 is a block diagram depiction 500 that depicts how a disclosed VBSU changes the voice subsystem to fit the needs of a NB telephony interface conferenced with other NB channels, according to an example embodiment. Sample/packet flows and VBSU control flows are shown, as are WB rate or NB rate operation after switching for the respective modules. VBSU control and switch logic 212 is shown controlling PCM interface 310 and line echo canceller 320, downsampler 236 between primary receive tone generator 335 and PCM interface 310, downsampler 236 between primary transmit tone generator 338 and the Tx path between line echo canceller 320 and conferencing unit 220 on the telephony side 230. On the network side 250, VBSU control and switch logic 212 is shown controlling downsampler 236' between secondary transmit tone generator 361 on the Rx path between and voice decoder algorithm 342 of CODEC 340 and conferencing unit 220.

Figure 6:
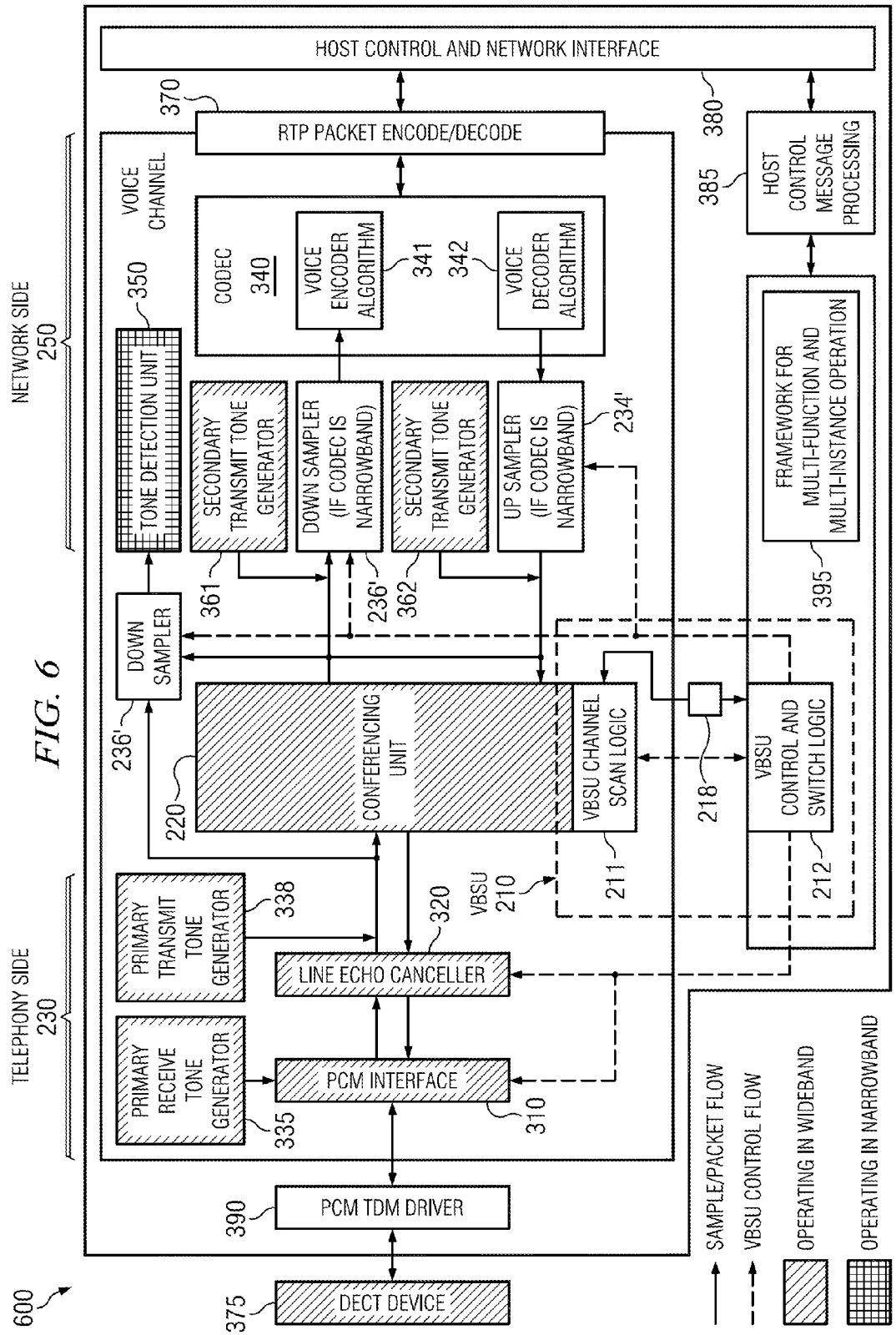
FIG. 6 depicts how a disclosed VBSU changes the voice subsystem to fit the needs of a WB telephony interface conferenced with other WB channels, according to an example embodiment.

FIG. 6 is a block diagram depiction 600 that depicts how a disclosed VBSU changes the voice subsystem to fit the needs of a WB telephony interface conferenced with other WB channels, according to an example embodiment. Sample/packet flows and VBSU control flows are shown, as are WB rate or NB rate operation for the respective modules. Any NB channels that are conferenced with the WB voice channel shown can be changed to a WB conference channel so as to not lose fidelity.

VBSU control and switch logic 212 is shown coupled to PCM interface 310 and line echo canceller 320 on telephony side 230, and on network side 250 to downsampler 236' that is coupled to tone detection unit 350, downsampler 236' coupled to voice encoder algorithm 341 of CODEC 340 (if CODEC 340 is NB), and upsampler 234' coupled to voice decoder algorithm 342 of CODEC 340 (if CODEC 340 is NB).

Disclosed VBSUs can be utilized in a variety of different application environments. For example, disclosed VBSUs can be utilized by IP phone and high density voice solutions which support WB voice. Another example is for Data Over Cable Service Interface Specification applications referred to as DOCSIS or Cable-Docsis.

EXAMPLES

Disclosed embodiments are further illustrated by the following specific simplified Examples, which should not be construed as limiting the scope or content of this Disclosure in any way.

Example 1

WB Channel Conferenced with a NB Channel

1) NB TDM channel running NB codec opened.
2) WB TDM channel running NB codec opened.
3) NB and WB TDM channels are conferenced together.
4) A disclosed VBSU is invoked when the conference occurs. The VBSU finds no previously established conferencing connections for either channel, the sampling rate of the NB TDM channel to be NB, and the sampling rate of the WB TDM channel to be WB.
5) To preserve the WB voice content the VBSU switches the NB channel to the WB rate by changing the rate for upsamplers and downsamplers.
6) The conference is established and each voice channel undergoes a brief mute in the TX and RX directions to avoid voice artifacts while the filters in the upsamplers and downsamplers converge.

Example 2

WB Channel Leaves Conference with NB Channel

1) WB TDM and NB TDM channels are conferenced together.
2) The conferencing connection between the two channels is completely deleted.
3) A disclosed VBSU is invoked just after the conference deletion occurs. The VBSU recursively parses all conferencing connections searching for all channels that may be attached to either of the, now disconnected, channels. It finds the NB TDM channel is no longer connected to any WB channels and is running a NB codec, thus allowing a switch back to the NB sampling rate. The VBSU also sees the WB TDM channel is still running a NB codec causing no changes to its upsamplers and downsamplers to occur.
4) The VBSU disables all upsamplers and downsamplers that are not required for NB sampling rate operation in the NB channel.
5) The NB channel undergoes a brief mute in the TX and RX directions to avoid voice artifacts while the filters in the up and downsamplers converge.

Example 3

A Codec Switchover to a WB Codec Occurs on a NB Channel that is Conferenced with Another NB Channel 1) Two NB TDM channels running NB codecs are conferenced together.
2) One of the NB TDM channels receives a packet with a WB coding type causing a codec switchover on the channel.
3) A disclosed VBSU is invoked when the codec switchover occurs. The VBSU finds the channel should switch to the WB sampling rate based on the previous and new codecs. The VBSU then recursively parses the conferencing connections and finds the affected channel is connected to another NB channel. This other channel will be switched to the WB rate as well.
4) The VBSU initiates a switch from the NB to the WB rate for both channels.
5) Each channel undergoes a brief mute in the TX and RX directions to avoid voice artifacts while the filters in the upsamplers and downsamplers converge.

Disclosed embodiments may be realized in hardware, software, or a combination of hardware and software. Disclosed embodiments may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Disclosed embodiments may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

I claim:

1. A method of dynamically switching between sampling rates for a plurality of conferenced voice channels in a telecommunication system including a telephony side, a network side, and a conferencing unit between said telephony side and said network side, comprising:
   detecting a presence of a switching stimuli during conferencing between said plurality of conferenced voice channels;
   identifying at least a first affected voice channel by said switching stimuli from said plurality of conferenced voice channels;
   responsive to said switching stimuli, based on a telephony side sampling rate of said first affected voice channel, a network side sampling rate of said first affected voice channel, and respective sampling rate of others of said plurality of conferenced voice channels, determining whether or not to switch a sampling rate for at least said first affected voice channel using a switching criteria;
   provided said determining indicates to switch, switching said sampling rate to a different sampling rate for at least said first affected voice channel; and
   identifying, by a control and switch logic, a selected group of upsamplers and downsamplers in at least said first affected voice channel to be either enabled or disabled, wherein said switching of said sampling rate is implemented by enabling or disabling said selected group upsamplers or downsamplers.

2. The method of claim 1, wherein said determining further comprises determining whether or not to switch a sampling rate for at least one of said others of said conferenced voice channels.

3. The method of claim 1, wherein said switching stimuli with respect to any of said plurality of conferenced voice channels comprises at least one selected from the group consisting of:
   a) a transmit direction codec switchover executed from a control message received from a host application;

b) a receive direction codec switchover executed when a packet is received by one of said plurality of conferenced channels with a different coding type than originally configured;

c) a conferencing connection is established with an ongoing wideband conference, and d) one or more conferencing connections are deleted.

4. The method of claim 1, further comprising adding a channel mute operation for said first affected voice channel after said switching.

5. The method of claim 1, wherein said telecommunication system comprises a time division multiplex (TDM) communications system.

6. A method of dynamically switching between sampling rates for a plurality of conferenced voice channels in a telecommunication system including a telephony side, a network side, and a conferencing unit between said telephony side and said network side, comprising:

detecting a presence of a switching stimuli during conferencing between said plurality of conferenced voice channels;

identifying at least a first affected voice channel by said switching stimuli from said plurality of conferenced voice channels;

responsive to said switching stimuli, based on a telephony side sampling rate of said first affected voice channel, a network side sampling rate of said first affected voice channel, and respective sampling rate of others of said plurality of conferenced voice channels, determining whether or not to switch a sampling rate for at least said first affected voice channel using a switching criteria;

provided said determining indicates to switch, switching said sampling rate to a different sampling rate for at least said first affected voice channel; and identifying, by a channel scan logic, said others of said plurality of conferenced voice channels by recursively parsing all conferencing connections searching for all of said conferenced channels that are connected to said first affected voice channel, wherein said recursive search forms a mapping of said others of said plurality of conferenced channels.

7. The method of claim 6, wherein said determining further comprises determining whether or not to switch a sampling rate for at least one of said others of said conferenced voice channels.

8. The method of claim 6, further comprising adding a channel mute operation for said first affected voice channel after said switching.

9. The method of claim 6, wherein said telecommunication system comprises a time division multiplex (TDM) communications system.

10. A Voice Band Switching Unit (VBSU) for dynamically switching between sampling rates for a plurality of conferenced voice channels units in a telecommunication system having voice circuitry comprising a telephony side, a network side, and a processor implementing a conferencing unit and a processing portion of said VBSU positioned between said telephony side and said network side, said VBSU comprising:

non-transitory machine readable storage having stored executable voice channel sampling rate switching software and a plurality of stored switching stimuli and switching criteria, wherein said VBSU implements:

control and switch logic for sensing at least a first affected voice channel affected by said switching stimuli from said plurality of conferenced voice channels;

channel scan logic for (i) sensing a presence of one of said plurality of switching stimuli and (ii) sensing said first affected voice channel's telephony side sampling rate, said first affected voice channel's network side sampling rate, and sampling rates for others of said conferenced voice channels, wherein said control and switch logic is further operable for determining whether or not to initiate switching of a sampling rate to a different sampling rate for at least said first affected voice channel based on said switching criteria, identifying a selected group of upsamplers and downsamplers in at least said first affected voice channel to be either enabled or disabled, and if said switching is indicated sending control signals to implement said enabling or said disabling for said selected group of said upsamplers and downsamplers.

11. The VBSU of claim 10, wherein said telecommunication system comprises time division multiplex (TDM) communications system.

12. The VBSU of claim 10, wherein said determining further comprises determining whether or not to switch a sampling rate for at least one of said others of said conferenced voice channels.

13. The VBSU of claim 10, wherein said switching stimuli with respect to any of said plurality of conferenced voice channels comprises at least one selected from the group consisting of:

a) a transmit direction codec switchover executed from a control message received from a host application;

b) a receive direction codec switchover executed when a packet is received by one of said plurality of conferenced channels with a different coding type than originally configured;

c) a conferencing connection is established with an ongoing wideband conference, and d) one or more conferencing connections are deleted.

14. The VBSU of claim 10, wherein said VBSU implements identifying said others of said plurality of conferenced voice channels by recursively parsing all conferencing connections searching for all of said conferenced channels that are connected to said first affected voice channel, wherein said recursive search forms a mapping of said others of said plurality of conferenced channels.

15. The VBSU of claim 10, wherein said VBSU further implements adding a channel mute operation for said first affected voice channel after said switching.

* * * * *